(12) United States Patent
Davies

(10) Patent No.: US 9,802,765 B2
(45) Date of Patent: Oct. 31, 2017

(54) TRANSFER APPARATUS AND METHOD OF TRANSFERRING A PLURALITY OF DISCRETE ARTICLES

(71) Applicant: 3M INNOVATIVE PROPERTIES COMPANY, St. Paul, MN (US)

(72) Inventor: Michael J. Davies, Swansea (GB)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/105,522

(22) PCT Filed: Dec. 11, 2014

(86) PCT No.: PCT/US2014/069672
§ 371 (c)(1),
(2) Date: Jun. 16, 2016

(87) PCT Pub. No.: WO2015/094887
PCT Pub. Date: Jun. 25, 2015

(65) Prior Publication Data
US 2016/0311631 A1    Oct. 27, 2016

(30) Foreign Application Priority Data
Dec. 18, 2013 (GB) .................................. 1322481.1

(51) Int. Cl.
*B65G 47/53* (2006.01)
*B65G 15/12* (2006.01)
*B65G 47/90* (2006.01)

(52) U.S. Cl.
CPC ............. *B65G 47/53* (2013.01); *B65G 15/12* (2013.01); *B65G 47/90* (2013.01)

(58) Field of Classification Search
CPC ...... B65G 15/10; B65G 15/105; B65G 15/12; B65G 15/14; B65G 47/261; B65G 47/30;
(Continued)

(56) References Cited

U.S. PATENT DOCUMENTS 4,006,831 A * 2/1977 Jimenez ................. B65B 57/20
271/213
4,620,826 A 11/1986 Rubio et al.
(Continued)

FOREIGN PATENT DOCUMENTS

CN 2552880 5/2003
CN 202744017 2/2013
(Continued)

OTHER PUBLICATIONS

International Search Report for PCT International Application No. PCT/US2014/069672 dated Mar. 13, 2015, 5 pages.

*Primary Examiner* — Mark A Deuble
(74) *Attorney, Agent, or Firm* — Aleksander Medved

(57) ABSTRACT

A transfer apparatus (1) for transferring a plurality of discrete articles (3) between a first location and a second location is disclosed. The apparatus comprises a transfer beam (9) comprising at least one article receiving means (10), adapted to be positioned adjacent the first location (7a) to receive at least one article. The transfer beam is also adapted to be adjacent the second location (7b) to discharge the at least one article. First and second bridging conveyors (12a; 12b) are located adjacent the second location and spaced apart such that the transfer beam is movable between the first and second bridging conveyors. A method of transferring articles using such an apparatus is also disclosed. Preferably the articles are abrasive discs.

16 Claims, 3 Drawing Sheets

(58) Field of Classification Search
CPC ...... B65G 47/68; B65G 47/681; B65G 47/53; B65G 47/69; B65G 47/90; B65G 47/901
USPC ........ 198/803.12, 867.09, 487.1, 468.6, 809, 198/418.6, 429, 430, 433
See application file for complete search history.

(56) References Cited

U.S. PATENT DOCUMENTS

| | | | | |
|---|---|---|---|---|
| 4,924,999 | A * | 5/1990 | Kikuchi | B65H 67/065 198/409 |
| 5,253,762 | A * | 10/1993 | Duncan | A21C 15/00 209/552 |
| 5,720,593 | A * | 2/1998 | Pleake | A21C 15/00 209/698 |
| 6,053,695 | A * | 4/2000 | Longoria | A21C 9/086 414/788.9 |
| 6,210,093 | B1 | 4/2001 | Hannen et al. | |
| 6,332,749 | B1 | 12/2001 | Garcia-Balleza et al. | |
| 6,361,265 | B1 * | 3/2002 | Mahoney | B65G 47/54 198/468.6 |
| 6,845,860 | B1 * | 1/2005 | Walker | B65G 47/53 198/433 |
| 2002/0110440 | A1 * | 8/2002 | Padovani | B65G 47/902 414/403 |
| 2005/0092581 | A1 * | 5/2005 | Walker | B65G 47/682 198/433 |
| 2006/0054463 | A1 * | 3/2006 | Walker | B65G 47/31 198/607 |
| 2009/0060701 | A1 | 3/2009 | Trejo | |
| 2014/0061091 | A1 | 3/2014 | Zhang et al. | |
| 2014/0262682 | A1 * | 9/2014 | Christopher | A21C 15/00 198/340 |

FOREIGN PATENT DOCUMENTS

| | | |
|---|---|---|
| GB | 775555 | 5/1957 |
| SU | 552136 | 3/1977 |
| WO | WO 97/49624 | 12/1997 |

* cited by examiner

TRANSFER APPARATUS AND METHOD OF TRANSFERRING A PLURALITY OF DISCRETE ARTICLES

CROSS REFERENCE TO RELATED APPLICATIONS

This application is a national stage filing under 35 U.S.C. 371 of PCT/US2014/069672, filed Dec. 11, 2014, which claims the benefit of GB application No. 1322481.1, filed Dec. 18, 2013, the disclosure of which is incorporated by reference in its/their entirety herein.

The present invention relates to a transfer apparatus and method of transferring a plurality of discrete articles between a first location and a second location.

Automated systems are typically used to manufacture a wide range of articles. One area in which such systems are used in an industrial context is in the manufacture of abrasive articles, such as abrasive discs or sheets. In this situation, a blank comprising a web of pre-formed abrasive material is wound from a reel and traverses through a system that cuts discrete abrasive articles from the web. These articles are subsequently discharged via a conveyor belt to a packing station. Various methods may be used to cut the discrete abrasive articles from the web. For example, a press set up may be used, where a tool comprising a number of cutting elements shaped to replicate the desired abrasive article shape is pressed into either the upper or the lower surface of the abrasive web, cutting through to reveal discrete abrasive articles. Alternatively, a laser set up may be used to burn through the abrasive web to reveal discrete abrasive articles. In each case once processed the waste abrasive web surrounding the newly cut discrete abrasive articles must be separated so that the discrete abrasive articles can be removed from the system and packaged for sale.

One way of doing this is to wind the waste abrasive web onto a take up reel located above the conveyor belt on which the web and discrete abrasive articles sit, separating the waste web from the discrete abrasive articles in the process. The discrete abrasive articles remaining on the conveyor belt can then be removed from the conveyor belt and stacked ready for packaging by hand or by using a mechanical pick and place system. This is where a grabber, such as a vacuum suction cup or device or a robot equipped with pincers or other gripping devices, is used to pick up individual discrete abrasive articles and stack them or otherwise place them for packaging.

One challenge with such an approach is typically how to automate the packaging process and integrate this into the automated manufacturing process for the discrete abrasive articles. Typically such articles are packed in groups of 10, 25, 50 or 100, stacked vertically about a central axis. Alignment of the articles for efficient packing and to avoid any damage to the articles themselves is therefore key, and can be time consuming and therefore costly if done by hand, and risk misalignment if done in an automated manner.

The present invention aims to address these issues by providing a transfer apparatus for transferring a plurality of discrete articles between a first location and a second location, the apparatus comprising: a transfer beam comprising at least one article receiving means, adapted to be positioned adjacent the first location to receive at least one article and adjacent the second location to discharge the at least one article; and first and second bridging conveyors located adjacent the second location and spaced apart such that the transfer beam is movable between the first and second bridging conveyors.

The use of receiving means that are movable between bridging conveyors that can transport collated stacks of articles to a packaging station increases the accuracy and speed at which such commodity products can be manufactured and packaged for sale.

Preferably the transfer beam comprises a plurality of receiving means. More preferably the transfer beam comprises an array of regularly spaced article receiving means. Yet more preferably, the array is a linear arrangement of receiving means.

The receiving means may comprise a locator. Preferably the locator comprises a cylindrical post.

Preferably the article is an abrasive article. Most preferably, the article is an abrasive disc.

In another aspect, the invention also provides a method of transferring a plurality of discrete articles between a first location and a second location, the method comprising: delivering a plurality of discrete articles to a first location; positioning a transfer beam comprising at least one article receiving means adjacent the first location; receiving at least one article onto the receiving means; positioning the transfer beam adjacent a second location; moving the transfer beam between first and second bridging conveyors located adjacent the second location, and spaced apart such that the transfer beam is movable between the first and second bridging conveyors; discharging the at least one article from the article receiving means onto the first and second bridging conveyors.

Preferably, the step of discharging the at least one article comprises lowering the transfer beam relative to the first and second bridging conveyors such that the at least one article remains on the first and second bridging conveyors.

Preferably, the method further comprises the step of moving the transfer beam after discharging the at least one article back to be adjacent to the first location.

The plurality of discrete articles may be delivered to the first location on a conveyor.

Preferably, the method yet further comprises: picking the at least one article up from the conveyor; moving the at least one article to be adjacent the receiving means; and dropping the at least one article onto the receiving means.

The transfer beam may comprise an array of regularly spaced article receiving means. Preferably the array is a linear arrangement of receiving means. More preferably the receiving means comprises a cylindrical post.

Preferably the article is an abrasive article. Most preferably, the article is an abrasive disc.

The present invention will now be described by way of example only, and with reference to the accompanying drawings, in which.

Figure 3:
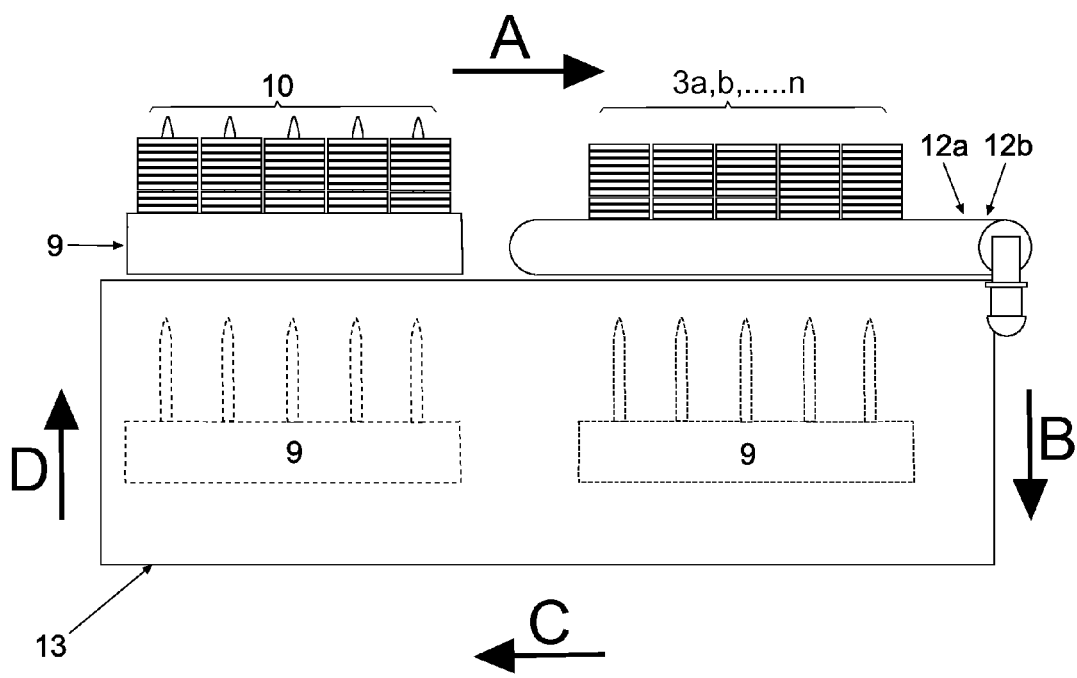
Figure 4A:
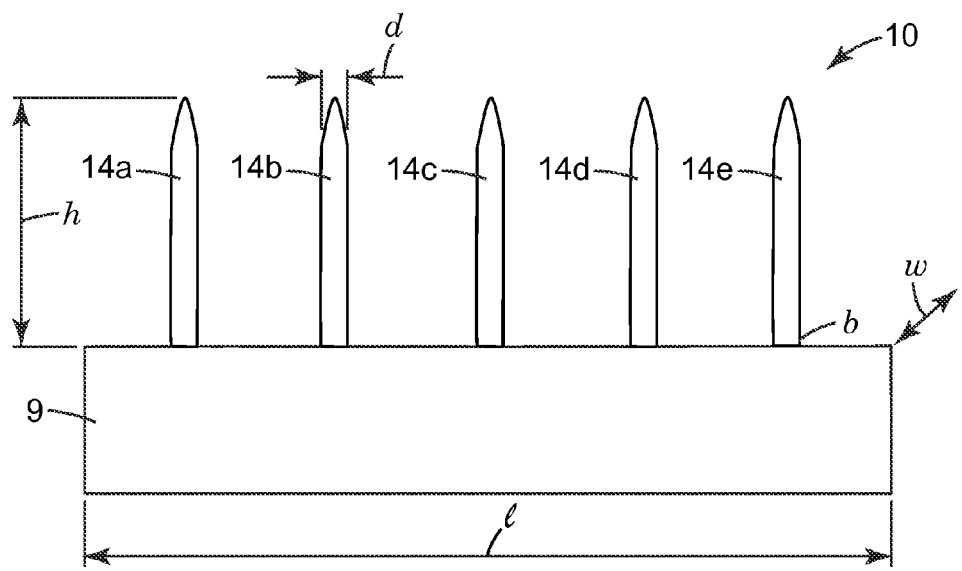
Figure 4B:
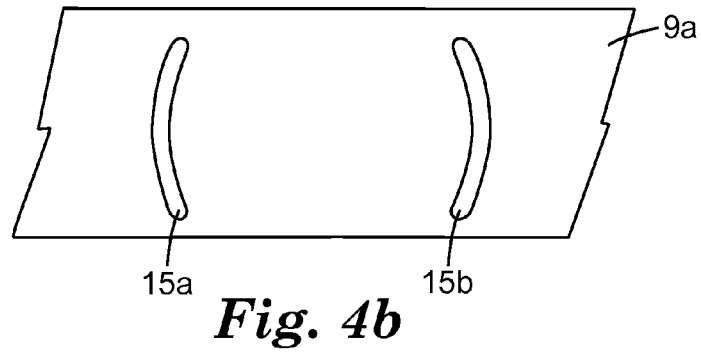
Figure 4C:
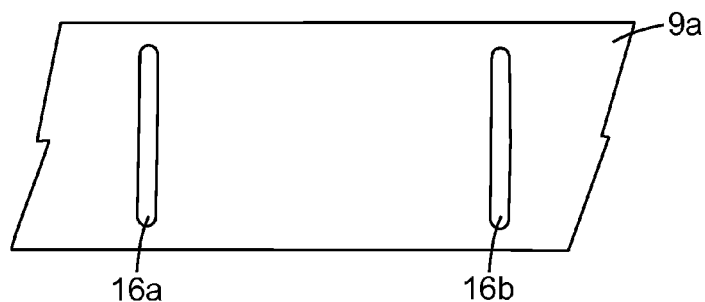

FIG. 3 a side view of a transfer apparatus in accordance with an embodiment of the present invention;

FIG. 4a is a side view of a first receiving means used in the transfer apparatus in accordance with an embodiment of the present invention;

FIG. 4b is a top view of a second receiving means used in the transfer apparatus in accordance with an embodiment of the present invention; and FIG. 4c is a top view of a third receiving means used in the transfer apparatus in accordance with an embodiment of the present invention.

The present invention takes the approach of automating the transfer of a plurality of discrete articles, preferably where the articles are abrasive articles, such as abrasive discs or abrasive sheets, by using a transfer beam. Articles are typically produced at a first location and packaged at a second location. The transfer beam preferably comprises at least one article receiving means, which is adapted to be positioned adjacent the first location to receive at least one article. The transfer beam is also adapted to be positioned adjacent the second location to discharge the at least one article. First and second bridging conveyors are located adjacent the second location. These are spaced apart such that the transfer beam is movable between the first and second bridging conveyors. This means that the articles can be placed on the bridging conveyors and moved to a packaging area in a simple and automated manner. Using such a transfer apparatus requires the delivering of a plurality of discrete articles to a first location. Positioning the transfer beam comprising at least one article receiving means adjacent the first location allows the receiving of at least one article onto the receiving means. Positioning the transfer beam adjacent a second location, moving the transfer beam between first and second bridging conveyors located adjacent the second location, spaced apart such that the transfer beam is movable between the first and second bridging conveyors, and discharging the at least one article from the article receiving means onto the first and second bridging conveyors enables the automated movement of such articles into a collated packing stack repeatedly, reliably and simply.

Figure 1:
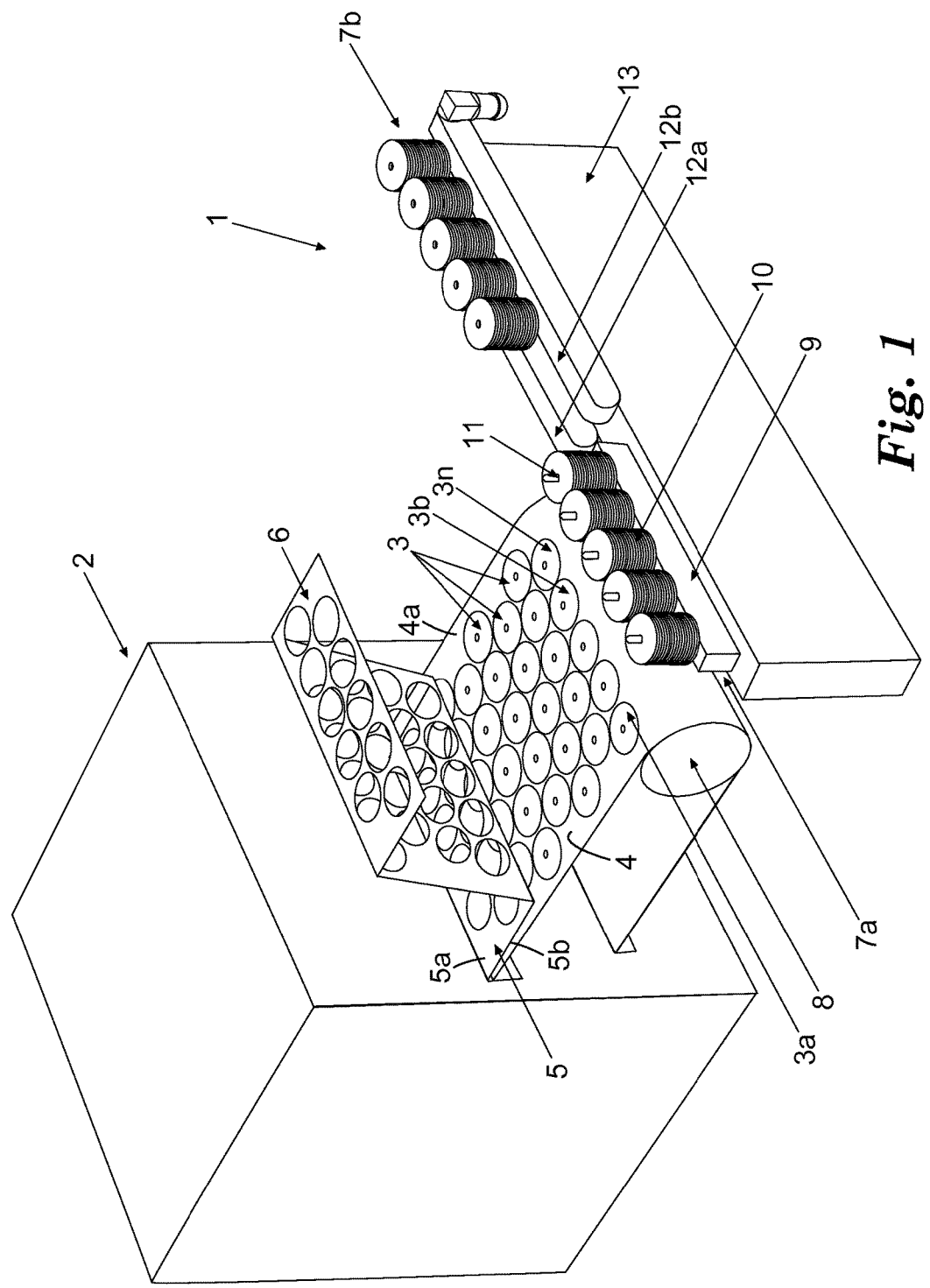
FIG. 1 is a perspective view showing a transfer apparatus in accordance with an embodiment of the present invention integrated into a production line.

FIG. 1 is a perspective view showing a transfer apparatus in accordance with an embodiment of the present invention integrated into a production line. The transfer apparatus 1 is integrated into a production line 2 for discrete abrasive articles 3. In this example the discrete abrasive articles are abrasive discs, but may, in an alternative embodiment, be abrasive sheets with a square, rectangular or triangular shape. The actual manufacturing method used to make the abrasive articles is immaterial (for example, this may be using a press arrangement or a laser arrangement as discussed above), as long as the discrete abrasive articles are presented on a moving surface, such as a conveyor belt. In FIG. 1 a plurality of discrete abrasive discs 3a, b . . . n, are presented in a planar fashion, with the plane of the abrasive disc being parallel with the plane of the conveyor belt 4 on which they lie, which in turn is parallel with the plane of the abrasive web 5 entering the production line 2 and parallel with the plane of the waste 6 as it exits the production line 2. The conveyor belt 4 is provided with an upper surface 4a, on which the abrasive web 5 and discrete abrasive discs 3a, b . . . n sit. The abrasive web 5 has an upper 5a and a lower surface 5b, the lower surface being in contact with the upper surface 4a of the conveyor belt 4. The upper surface 5a of the abrasive web 5 is an abrasive coating, and the lower surface 5b is an attachment surface such as hook and loop or brushed nylon material. Consequently the discrete abrasive discs 3a, b . . . n are formed with an abrasive surface uppermost and attachment surface lowermost.

On exiting the production line 2, the waste 6 is removed from around the abrasive discs 3a, b . . . n by winding on a take up reel (not shown) located above the conveyor belt 4. As the waste 6 is lifted up away from the conveyor belt 4 the abrasive discs 3 a, b . . . n remain on the upper surface 4a of the conveyor belt 4, where they are transported to a first location 7a. The first location 7a marks the point where the abrasive discs 3a, b . . . n are discharged from the production line 2 to the transfer apparatus 1. At this point the conveyor belt 4 turns over a roller 8 and the abrasive discs 3a, b . . . n must be removed from the conveyor belt 4 or will be wasted.

The transfer apparatus 1 comprises a transfer beam 9, comprising at least one article receiving means 10, and which is adapted to be positioned adjacent the first location 7a to receive at least one abrasive article 3a, b . . . n. The transfer beam 9 is formed from a modular extruded aluminium section, and has a width in the range of 50-60 mm. The length of the transfer beam 9 is determined by the number of receiving means 10 required for the width of the abrasive web 5. In this example five are provided, although any number may be used. Preferably for a typical wide-web abrasive production line 2 ten receiving means 10 are used.

The transfer beam 9 comprises an array of regularly spaced receiving means 10. Typically the array is a linear arrangement of receiving means 10. The receiving means 10 comprises a locator, and for abrasive discs the locator comprises a cylindrical post. In this example, five receiving means 10a-e are provided in the form of a cylindrical post. Other forms of locator may be used depending on the abrasive article configuration as discussed in more detail below with reference to FIGS. 4a, 4b and 4c. When the transfer beam 9 is positioned adjacent the first location 7a the discrete abrasive articles 3a, b . . . n are removed individually from the conveyor belt 4 and placed onto the receiving means. In this example the abrasive articles 3a, b . . . n are provided with a central hole 11, which is positioned over the cylindrical post such that when the abrasive article 3a, b . . . n is lowered onto the cylindrical post or the cylindrical post raised upwards through the central hole 11 the abrasive article 3 a, b . . . n is stackable on the cylindrical post. In this way the cylindrical post serves as a locator, with the positioning of the abrasive article 3a, b . . . n controlled by the diameter of the hole 11 and the diameter of the cylindrical post.

In this example, the abrasive web 5 is provided in sufficient width that five abrasive discs, each having a diameter of 150 mm, are cut across the width of the web, hence five receiving means 10 are provided on the transfer beam 9. However, other diameters or shapes may be cut, leading to more or fewer abrasive articles and corresponding receiving means 10. In this example a pick and place system (not shown) is used to lift the discrete abrasive discs 3a, b . . . n, from the upper surface 4a of the conveyor belt 4 on which they are positioned and to move the discrete abrasive discs 3a, b . . . n over the receiving means 10, and to discharge the discrete abrasive discs 3a, b . . . n. The pick and place system comprises five vacuum suction shoes that, when in use, each one of which contacts the free surface of one of the discrete abrasive discs 3a, b . . . n, and hold the disc with sufficient force to remove it from the conveyor belt 4. Once removed from the conveyor belt 4, the pick and place system moves each of the discrete abrasive discs 3a, b . . . n towards the transfer beam 9, and aligns the central hole 11 in each of the discrete abrasive discs 3a, b . . . n with the cylindrical post, and lowers each of the discrete abrasive discs 3a, b . . . n to just above the tip of the cylindrical post. At this point the vacuum suction is stopped and the discrete abrasive discs 3a, b . . . n are released. The discrete abrasive discs 3a, b . . . n slide downwards onto the receiving means 10 such that they are received. The diameter of the cylindrical post forming the receiving means 10 is chosen such that the discrete abrasive discs 3a, b . . . n fit neatly over the cylindrical post with a tolerance on the central hole 11 diameter in the range of ±0.5 mm to ±1.5 mm. Regardless of the size of the discrete abrasive discs 3a, b . . . n, the transfer beam 9 has a length and a width, the length accommodating the corresponding number of receiving means 10 required for the number of discrete abrasive discs 3a, b . . . n produced across the width of the web, the receiving means 10 being spaced apart such that the discrete abrasive discs 3a, b . . . n are not in contact with each other, and the width being such that the discrete abrasive discs 3a, b . . . n overhang the edges of the transfer beam 9.

This pick and place process is repeated a pre-determined number of times depending on how many discrete abrasive discs 3a, b . . . n are to be packaged together. For example, in a typical pack of 150 mm diameter discrete abrasive discs 3a, b . . . n, 25 discs are packaged together in one box, so the pick and place step would be repeated 25 times. Each receiving means 10 when loaded creates a collated stack of articles, aligned to within acceptable tolerances and easily packaged at an appropriate packing station (again, not shown). It may be necessary or desirable to oscillate the transfer beam 9 to receive alternate discrete abrasive discs 3a, b, . . . n, depending on the positioning and arrangement of the discrete abrasive discs 3a, b, . . . n on the conveyor 4 at the first position 7a.

At the end of the pre-determined number of repeats, the receiving means 10 is full. At this point the transfer beam 9 is moved away from the first location to a second location 7b. This movement occurs by lateral transfer of the transfer beam 9 between the first location and the second location 7b. The second location 7b is adjacent first 12a and second 12b bridging conveyors. The first 12a and second 12b bridging conveyors are spaced apart such that the transfer beam 9 is moveable between them. Each of the first 12a and second 12b bridging conveyors is 50 mm in width, and comprises a belt wound around extruded aluminium rollers. Typical belt materials include reinforced plastic materials, such as fibre-reinforced PVC, or nylon. To discharge the discrete abrasive discs 3a, b . . . n, the transfer beam 9 is moved laterally between the first 12a and second 12b bridging conveyors. The transfer beam 9 is lowered such that the overhanging discrete abrasive discs 3a, b . . . n contact the first 12a and second 12b bridging conveyors. The transfer beam 9 is the further lowered such that the discrete abrasive discs 3a, b . . . n come to rest in a stack on the surfaces of the first 12a and second 12b bridging conveyors. The transfer beam 9 is then moved away from the first 12a and second 12b by a lateral translation away from the second location 7b back towards the first location. On reaching the first location the transfer beam 9 is raised back into its original position, ready to receive further discrete abrasive discs 3a, b . . . n. This is further illustrated in FIG. 2.

Figure 2:
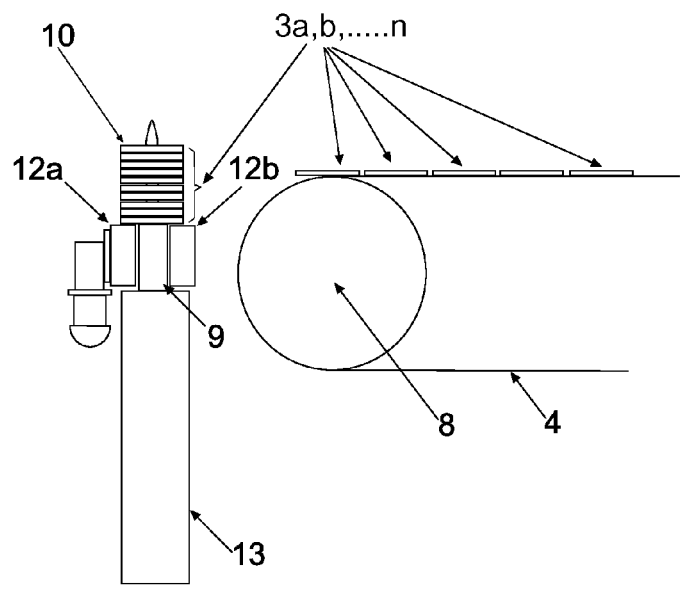
FIG. 2 is a cross-sectional view of a transfer apparatus in accordance with an embodiment of the present invention illustrating the structure of the transfer apparatus.

FIG. 2 is a cross-sectional view of a transfer apparatus in accordance with an embodiment of the present invention illustrating the structure of the transfer apparatus. A stack of discrete abrasive discs 3a, b . . . n is shown in a stack on a cylindrical post, with the transfer beam 9a in the first location adjacent the conveyor belt 4. The transfer beam 9 is supported on a transfer beam shuttle 13, which provides the lateral movement of the transfer beam 9 to and from the first 7a and second 7b locations, between the first 12a and second 12b bridging conveyors and both raises and lowers the transfer beam 9 to receive and discharge discrete abrasive discs 3a, b . . . n.

FIG. 3 a side view of a transfer apparatus in accordance with an embodiment of the present invention. This shows the process of raising the transfer beam 9 into the first location and withdrawing/lowering it away from the second location 7b, as well as the translational movement in more detail. Initially, the transfer beam 9 is in the first location, where discrete abrasive discs 3a, b . . . n are received onto the receiving means 10, loading the transfer beam 9. A plurality of discrete abrasive discs 3a, b . . . n is delivered to the first location 7a on the conveyor 4. At this point each of the discrete abrasive discs 3a, b . . . n is picked up from the conveyor 4, moved to be adjacent the receiving means 10 and dropped onto the receiving means 10. This is done via the pick and place system (not shown). The transfer beam 9 is then moved laterally using a translational movement to the second location 7b (in the direction of arrow A), between the first 12a and second 12b bridging conveyors, onto which the discrete abrasive discs 3a, b . . . n are discharged. The movement of the first 12a and second 12b bridging conveyors causes the discrete abrasive discs 3a, b . . . n to be moved to a packaging station (not shown). The discrete abrasive discs 3a, b . . . n are discharged from the receiving means 10 by the transfer beam 9 being lowered between the first 12a and second 12b bridging conveyors (in the direction of arrow B), such that the discrete abrasive discs 3a, b . . . n remain on the first 12a and second 12b bridging conveyors. Once the discrete abrasive discs 3a, b . . . n are discharged the lowering of the transfer beam 9 continues as shown, withdrawing through the first 12a and second 12b bridging conveyors. At this point the transfer beam shuttle 13 moves the transfer beam 9 in a translational manner back to below the first location (in the direction of arrow C) and then raises the transfer beam 9 back up to the first location, adjacent the conveyor belt 4 (in the direction of arrow D). By moving the transfer beam 9 after discharging the discrete abrasive discs 3a, b . . . n back to be adjacent the first location 7a the receiving means 10 are able to receive further discrete abrasive discs 3a, b . . . n. The transfer beam shuttle 13 is controlled using a linear servo system, although may be controlled using a pneumatic drive system with appropriate stops, or a combination thereof. The advantage of using a linear servo system is that no stops are required and the transfer beam shuttle 13 is fully position adjustable with an appropriate level of fine-tuning.

In order to ensure that the manufacture of such discrete abrasive discs 3a, b . . . n is a continuous, inline process, two or more transfer beams 9 may be used to ensure continuous collection of discrete abrasive discs 3a, b . . . n, such that a first transfer beam 9 may be receiving discrete abrasive discs 3a, b . . . n whilst a second transfer beam 9 is discharging discrete abrasive discs 3a, b . . . n.

In the above example the discrete article is a discrete abrasive disc. In this situation the receiving means 10 comprise cylindrical posts. This is illustrated in FIG. 4a, a side view of a first receiving means used in the transfer apparatus in accordance with an embodiment of the present invention. The transfer beam 9 has a length l and a width w, and is provided, on a first, upper surface 9a, with five cylindrical posts 14a-14e, each cylindrical post 14a-14e having a diameter d and a height h, with the diameter d constant from the base b of the cylindrical post 14a-14e to adjacent the distal end of the cylindrical post, where the cylindrical post tapers to a point in the form of a cone.

Each cylindrical post 14a-14e is sized to accept a predetermined number of discrete abrasive discs, each of which is provided with a central hole 11. This may be 25, 50 or 100 discrete abrasive discs dependent on grit size and pack size. The cylindrical posts 14a-14e are formed from a nylon material, although other materials, including metals or alloys such as aluminium, reinforced composite materials and other plastics may also be used.

Each cylindrical post 14a-14e is positioned along the transfer beam 9 so as to be equidistant from the next cylindrical post 14a-14e. In this manner the discrete abrasive discs 3a, b . . . n can be placed in individual stacks, where no stack impinges on another. Each cylindrical post 14a-14e is mounted on the transfer beam 9 by means of a base plate (not shown) that each cylindrical post 14a-14e is slotted into, and the base plate fixed to the transfer beam 9 by means of screws (again, not shown) that are screwed into channels provided in the extruded structure of the transfer beam 9.

FIG. 4b is a top view of a second receiving means used in the transfer apparatus in accordance with an embodiment of the present invention. In this example, rather than a cylindrical post first 15a and second 15b retaining means in the form of barriers are provided on the upper surface 9a of the transfer beam 9. For discrete abrasive discs 3a, b . . . n the first 15a and second 15b retaining means are in the form of arcuate barriers, which extend around substantially half of the circumference of the discrete abrasive discs 3a, b . . . n and are spaced apart such that the abrasive discs 3a, b . . . n fit between the barriers. Each retaining means 15a, 15b has a height h sized to receive a pre-determined number of discrete abrasive discs 3a, b . . . n. Other numbers of arcuate barriers may be used if desired, for example, a single circular barrier, or three, four or more barriers spaced around a circumference, of differing lengths and separated by differing gaps, as required. The retaining means are mounted on the transfer beam 9 by means of screws as described above. Each barrier may be formed from a from a nylon material, although other materials, including metals or alloys such as aluminium, reinforced composite materials and other plastics may also be used. FIG. 4c is a top view of a third receiving means used in the transfer apparatus in accordance with an embodiment of the present invention. In this example, rather than arcuate retaining means, first 16a and second 16b retaining means in the form of barriers are provided on the upper surface 9a of the transfer beam 9. For discrete abrasive articles in the form of rectangular sheets the first 16a and second 16b retaining means are in the form of liner barriers, positioned parallel to each other and spaced apart such that the abrasive articles fit between the barriers. Each retaining means 16a, 16b has a height h sized to receive a pre-determined number of discrete abrasive sheets. Other numbers of linear barriers may be used if desired, for example, a single rectangular barrier, or two "L"-shaped, spaced around a perimeter, of differing lengths and separated by differing gaps, as required. The retaining means are mounted on the transfer beam 9 by means of screws as described above. Each barrier may be formed from a from a nylon material, although other materials, including metals or alloys such as aluminium, reinforced composite materials and other plastics may also be used.

Other embodiments within the scope of the present invention will be apparent from the appended claims.

The invention claimed is:

1. Transfer apparatus for transferring a plurality of discrete articles between a first location and a second location, the apparatus comprising:

a transfer beam comprising at least one article receiving means, adapted to be positioned adjacent the first location to receive at least one article and adjacent the second location to discharge the at least one article; and first and second bridging conveyors located adjacent the second location and spaced apart such that the transfer beam is movable between the first and second bridging conveyors;

wherein the receiving means comprises a locator.

2. Apparatus of claim 1, wherein the transfer beam comprises a plurality of receiving means.

3. Apparatus of claim 1, wherein the transfer beam comprises an array of regularly spaced article receiving means.

4. Apparatus of claim 3, wherein the array is a linear arrangement of receiving means.

5. Apparatus of claim 1, wherein the locator comprises a cylindrical post.

6. Apparatus of claim 1, wherein the article is an abrasive article.

7. Apparatus of claim 1, wherein the article is an abrasive disc.

8. Method of transferring a plurality of discrete articles between a first location and a second location, the method comprising:

delivering a plurality of discrete articles to a first location;

positioning a transfer beam comprising at least one article receiving means adjacent the first location, the receiving means comprises a locator;

receiving at least one article onto the receiving means;

positioning the transfer beam adjacent a second location;

moving the transfer beam between first and second bridging conveyors located adjacent the second location, and spaced apart such that the transfer beam is movable between the first and second bridging conveyors;

discharging the at least one article from the article receiving means onto the first and second bridging conveyors.

9. Method of claim 8, wherein the step of discharging the at least one article comprises lowering the transfer beam relative to the first and second bridging conveyors such that the at least one article remains on the first and second bridging conveyors.

10. Method of claim 8, further comprising the step of:

moving the transfer beam after discharging the at least one article back to be adjacent to the first location.

11. Method of claim 8, wherein the plurality of discrete articles is delivered to the first location on a conveyor.

12. Method of claim 11, wherein the method further comprises:

picking the at least one article up from the conveyor;

moving the at least one article to be adjacent the receiving means; and dropping the at least one article onto the receiving means.

13. Method of claim 8, wherein the transfer beam comprises an array of regularly spaced article receiving means.

14. Method of claim 13, wherein the array is a linear arrangement of receiving means.

15. Method of claim 8, wherein the receiving means comprises a cylindrical post.

16. Method of claim 8, wherein the article is an abrasive article.

* * * * *